Patented May 3, 1932

1,856,434

UNITED STATES PATENT OFFICE

ALBRECHT SCHMIDT, OF FRANKFORT-ON-THE-MAIN, GERMANY, ASSIGNOR TO GENERAL ANILINE WORKS, INC., OF NEW YORK, N. Y., A CORPORATION OF DELAWARE

PRINTING PASTES FROM DYESTUFFS AND PROCESS OF PREPARING THEM

No Drawing. Application filed September 19, 1928, Serial No. 307,053, and in Germany August 29, 1928.

The present invention relates to dyestuff pastes, particularly to printing pastes and a process of preparing such pastes.

When heating an urea or its derivatives with a large excess of an alcohol or a ketone, preferably in the presence of a catalyst and while using pressure, new products of an oily or resinous character are obtained (see British Patents Nos. 278,390; 280,238; 290,192; 292,595).

I have found that by adding the above mentioned products made by condensing a urea with products which may be characterized by the formula: R—X, wherein R signifies an organic residue and X signifies the alcoholic OH-group or the CO—R-group, to dye-pastes, there are obtained printing pastes which give more intense prints, when used together with the usual printing and fixing agents, than the printing pastes made without any addition of the said products. The prints are distinguished by the fact, that they are not stained or speckled, but of great evenness. The addition of the condensing products in question has the further advantage, that between the printing and steaming operations the course of the process may be interrupted without the prints thereby becoming fainter, as it often happens in that case.

The products may be added either during the preparation of the printing color or when the color is made up into the commercial dyestuff paste. In some cases, it is advantageous, to effect the mixture of the dye-paste with the said products, while heating; thus, pastes are obtained which are extremely finely subdivided and do not form any deposits. The addition of a sufficient quantity of the condensation products to the commercial pastes involves the advantage that the detrimental formation of crusts is entirely avoided.

The following examples serve to illustrate the invention, but they are not intended to limit it thereto:

1. 100 grams 2,1-naphthoxy thiophene-2.3-dichloro-5'7'-indolindigo of 20% strength, are mixed with 20 grams of the concentrated condensation product from urea and butylene glycol and the whole is concentrated to 100 grams. From this dye paste, a printing color is prepared by the following addition of: 40 grams of glycerine, 15 grams of sodium benzyl sulfanilate, 60 grams of potash, 200 grams of wheat starch-tragacanth thickening and 75 grams of formaldehyde-sodium sulfoxylate 1:1, the whole being made up with water to 500 grams.

2. 30 grams of glycerine and 20 grams of the condensation product from urea and butylene glycol are mixed with 40 grams of dyestuff No. 763 of 20 per cent strength, 40 grams of dyestuff No. 842 of 20 per cent strength and 20 grams of dyestuff No. 760 of 20 per cent strength (said dyestuffs being defined in Schultz "Farbstoff Tabellen" 6th edition, 1923), the whole is evaporated to 100 grams. The printing color may then be prepared in the same manner as indicated in Example 1.

I claim:

1. As new products, dyestuff pastes from dyestuffs, containing condensation products obtained by heating a urea with an excess of a compound of the following general formula: R—X, wherein R signifies an organic residue and X signifies the alcoholic OH-group or the CO—R-group.

2. As new products, printing pastes from vat dyestuffs, containing condensation products obtained by heating urea with an excess of butylene glycol.

3. In a process of preparing dyestuff pastes the step which consists in mixing any color paste with a condensation product obtained by heating a urea with an excess of a compound of the following general formula: R—X, wherein R signifies an organic residue and X signifies the alcoholic OH-group or the CO—R-group, while heating.

4. In a process of preparing dyestuff pastes, the step which consists in mixing a vat dyestuff paste with the condensation product obtained by heating urea with an excess of butylene glycol, while heating.

5. As new products, dyestuff pastes containing a condensation product obtainable by heating a urea with an excess of a compound of the following general formula: R—X, wherein R signifies an organic residue and X signifies the alcoholic OH-group or the CO—R-group.

6. As new products, vat dyestuff pastes containing a condensation product obtainable by heating a urea with an excess of butylene glycol.

7. As a new product, a paste from 2.1-naphthoxythiophene-2.3-dichloro-5'.7'-indolindigo containing a condensation product obtainable by heating a urea with an excess of butylene glycol.

8. As a new product, a paste from a mixture of the dyestuffs Nos. 763, 842 and 760 of Schultz "Farbstofftabellen" 6th ed., 1923, in a proportion of 4:4:2 containing a condensation product obtainable by heating urea with an excess of butylene glycol.

In testimony whereof, I affix my signature.

ALBRECHT SCHMIDT.